Dec. 5, 1933.   J. H. STANSBURY   1,937,850
VEGETABLE CUTTER
Filed March 27, 1931

Inventor
John H. Stansbury,
By Stone, Boyden, Mack & Hahn,
Attorneys.

Patented Dec. 5, 1933

1,937,850

UNITED STATES PATENT OFFICE 1,937,850

VEGETABLE CUTTER

John Herbart Stansbury, Fruitland, Md., assignor of one-half to Ralph O. Dulany, Fruitland, Md.

Application March 27, 1931. Serial No. 525,829

5 Claims. (Cl. 146—119)

This invention relates to machines for cutting up vegetables and the like, and more particularly to machines of the type employing a rotary cutter in cooperative relation with a travelling belt or conveyor.

In machines of this type, it has been found that where the usual smooth or flat belt is employed, the knives or blades frequently fail to cut entirely through the vegetable, so that the pieces are not completely severed from each other but hang together or remain attached at one side.

In order to overcome this difficulty, I have devised an improved form of belt having corrugations upon its surface. These corrugations coact with the blades of the cutter in such a manner as to insure the complete severance of the pieces.

In order that the invention may be readily understood, reference is had to the accompanying drawing, forming part of this specification, and in which.

Figure 1:
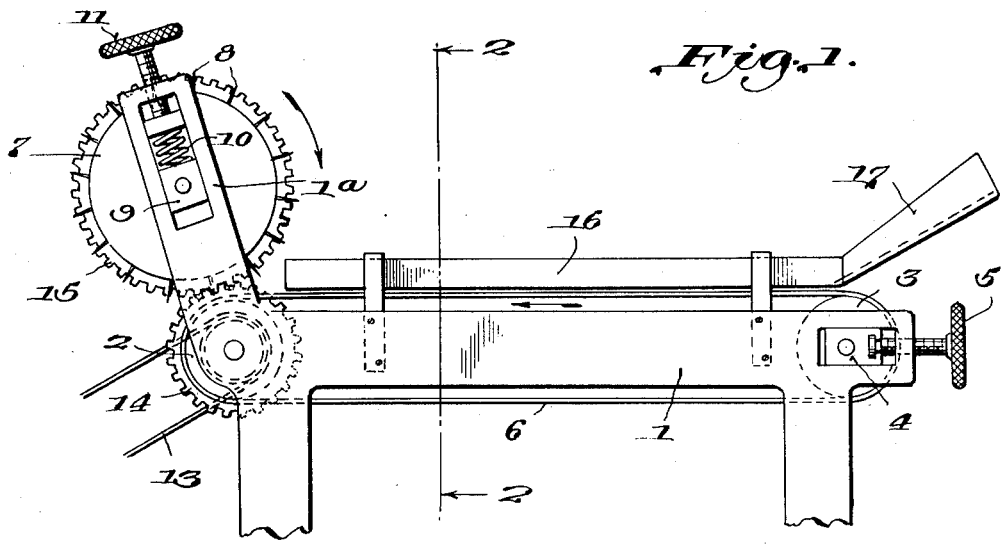
Figure 1 is a side elevation of a vegetable cutter of the type in question.
Figure 2:
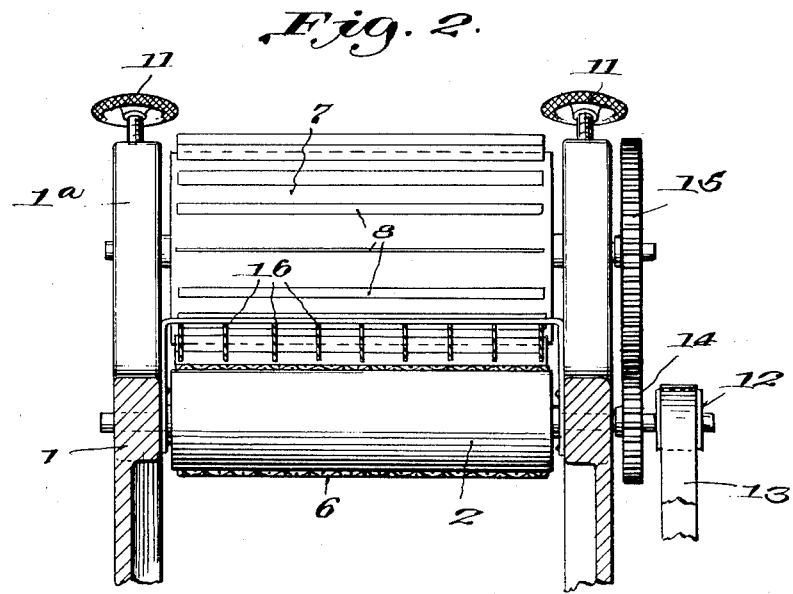
Figure 2 is a tranverse section on the line 2—2 of Figure 1, looking in the direction of the arrows.

Referring to the drawing in detail, I have illustrated a machine of the type commonly used for cutting up string beans into short sections. The machine comprises a frame 1, on the opposite ends of which are mounted horizontal rollers 2 and 3, one of these, as for example the roller 3, being journalled in adjustable bearings 4 which can be moved as by means of a screw and hand wheel 5.

Passing around the rollers 2 and 3 is an endless conveyor belt 6, formed of flexible material such as canvas and rubber, the upper run of the belt being horizontal and constituting in effect a travelling bed on which the beans are supported.

A rotary cutter is shown as comprising a cylindrical body 7 having projecting radially therefrom a plurality of axially extending knives or blades 8, these blades being spaced apart a distance equal to the length of the sections into which it is desired to cut the beans. The roller 7 is journalled in sliding bearings 9 mounted in an extension 1ᵃ of the frame and urged toward the roller 2 by means of springs 10, the tension of which can be adjusted by means of hand wheels 11.

Secured to one of the shafts, as for example, to the shaft supporting the roller 2, is a driving pulley 12, to which power may be applied by means of a belt 13. This roller 2 and the roller 7 carrying the blades are geared together by means of gears 14 and 15, secured to the respective shafts, and of such relative sizes that the peripheral speeds of the blades and of the conveyor belt 6 at the point of contact are substantially the same. Thus, it will be seen that the rotary cutter is in substantial rolling contact with the belt or conveyor 6 at the point where the latter passes around the roller 2, being held in engagement with the belt by means of the springs 10.

Figure 3:
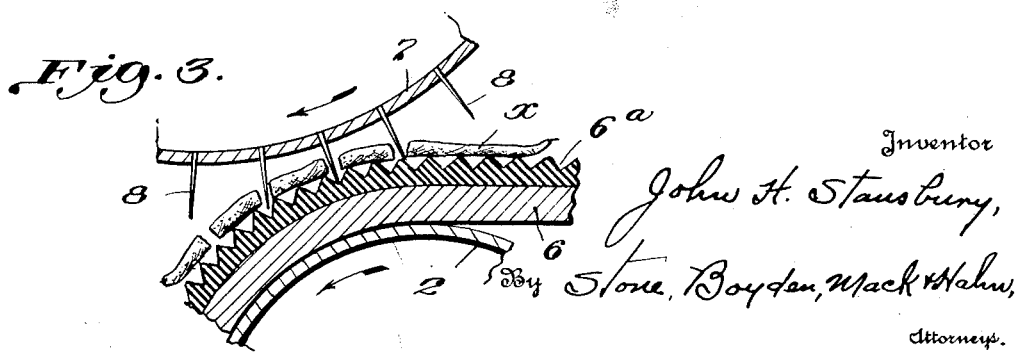
Figure 3 is a fragmentary transverse section on an enlarged scale through the belt and cutter, showing the manner in which the blades cooperate with the belt.

My improved belt constituting the subject of the present invention is shown in Figure 3, and the improvement consists in forming the upper surface of the belt, which preferably consists of a layer of rubber or the like, with transverse corrugations, as indicated at 6ᵃ, these corrugations presenting alternating ridges and grooves which are substantially parallel with the axially extending blades 8 of the cutter. When, therefore, these blades come into rolling contact with the belt, as described, the blades enter the grooves or depressions in the corrugated surface of the belt, as clearly shown in Figure 3.

It is not necessary that there be any definite relation between the spacing of the blades 8 and the spacing of the corrugations 6ᵃ, because the blades are more or less flexible and their edges will tend to slide down the sides of the ridges forming the corrugations into the grooves thereof, even if they do not register exactly with the grooves. Preferably, and as shown, the ridges are wedge shape, so as to provide flat inclined surfaces at their sides.

In Figure 3, a string bean is illustrated at $x$. This bean, as will be seen, rests upon the tops of the ridges of the travelling bed or belt, while the blades 8, as above described, enter the grooves of such belt, thus passing entirely through the bean pod and completely and cleanly severing the same into sections, as shown. Thus, with my improved corrugated or grooved belt, there is no possibiliy of the blades failing to completely sever the bean pods.

In practice, a series of spaced longitudinal guides 16, extending lengthwise of the upper run of the belt 6, are provided for the purpose of causing the bean pods to arrange themselves parallel to the direction of travel and present themselves endwise to the cutter. A chute or hopper 17 is provided by means of which the beans are fed to the machine, in the usual manner.

What I claim is:

1. A vegetable cutting machine comprising a rotary cutter having radial axially disposed blades, a travelling bed mounted to co-operate with said cutter and having on its surface transversely extending grooves, and means for driving said cutter and bed at substantially the same peripheral speed, said cutter and bed being positioned at such a distance apart that said blades enter said grooves as the cutter revolves.

2. A vegetable cutting machine comprising a travelling bed having transversely extending grooves, and a rotary cutter cooperating with said bed and having its axis parallel with said grooves, said cutter having radial, axially disposed blades of a radial length sufficient to reach substantially the bottom of said grooves, said blades adapted to enter said grooves as the cutter rotates.

3. A vegetable cutting machine comprising a travelling bed having a surface formed of transversely extending substantially triangular corrugations, providing ridges and grooves, and a rotary cutter cooperating with said bed and in substantial rolling contact therewith, said cutter having radial, axially disposed, slightly flexible blades of a length sufficient to reach substantially the bottom of said grooves, said blades adapted to slide down the sides of said ridges and enter said grooves, as the cutter revolves.

4. A vegetable cutting machine comprising a travelling bed having transversely extending grooves in the surface thereof, a rotary cutter having radial axially disposed blades of a length sufficient to reach substantially the bottom of said grooves, said blades being flexible and adapted to enter said grooves as the cutter rotates.

5. A vegetable cutting machine comprising a travelling bed having transversely extending grooves formed in the surface thereof, a rotary cutter cooperating with said bed having radial axially disposed flexible blades adapted to enter said grooves as said cutter rotates, and means for driving said cutter and bed at substantially the same peripheral speed.

JOHN HERBART STANSBURY.